(12) United States Patent
    Eliaz

(10) Patent No.: US 8,976,853 B2
(45) Date of Patent: Mar. 10, 2015

(54) SIGNAL RECEPTION USING NON-LINEARITY-COMPENSATED, PARTIAL RESPONSE FEEDBACK

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/052,859

(22) Filed: Oct. 14, 2013

(65) Prior Publication Data

US 2014/0105267 A1    Apr. 17, 2014

Related U.S. Application Data

(63) Continuation of application No. 13/755,014, filed on Jan. 31, 2013, now Pat. No. 8,559,496.

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
    *H04L 27/01*    (2006.01)
    *H04B 1/04*    (2006.01)
    (Continued)

(52) U.S. Cl.
    CPC ............... *H04B 1/0475* (2013.01); *H04B 1/10* (2013.01); *H04L 23/02* (2013.01); *H04L 27/04* (2013.01); *H04L 27/00* (2013.01); *H04L 27/02* (2013.01); *H04L 25/03178* (2013.01); *H04L 27/01* (2013.01); *H04L 25/03834* (2013.01); *H04L 27/36* (2013.01); *H04L 25/03949* (2013.01); *H04L 7/0087* (2013.01); *H04L 25/03006* (2013.01); *G06F 11/10* (2013.01); *H04B 1/16* (2013.01); *H04L 25/03057* (2013.01); *H04L 25/03305* (2013.01); *H04L 25/03318* (2013.01); *H04L 25/03337* (2013.01); *H04L 1/206* (2013.01); *H04L 25/03038* (2013.01);
    (Continued)

(58) Field of Classification Search
    USPC .................... 375/316, 346, 229, 232, 233
    See application file for complete search history.

(56) References Cited

U.S. PATENT DOCUMENTS 4,109,101 A    8/1978    Mitani
4,135,057 A    1/1979    Bayless, Sr. et al.
    (Continued)

OTHER PUBLICATIONS

Int'l Search Report and Written Opinion for PCT/IB2013/01866 dated Mar. 21, 2014.
(Continued)

*Primary Examiner* — Siu Lee
(74) *Attorney, Agent, or Firm* — McAndrews, Held & Malloy, Ltd.

(57) ABSTRACT

A receiver may receive a signal that was generated by passage of symbols through a non-linear circuit. An equalizer of the receiver may equalize the received signal based on a first non-linearity compensated, inter-symbol correlated (ISC) feedback signal to generate an equalized signal. The receiver may correct a phase error of the equalized signal to generate a phase-corrected equalized signal. The phase correction may be based on a second, non-linearity compensated, inter-symbol correlated (ISC) feedback signal.

30 Claims, 16 Drawing Sheets

(51) Int. Cl.

| | | |
|---|---|---|
| *H04B 1/10* | (2006.01) | |
| *H04L 23/02* | (2006.01) | |
| *H04L 27/04* | (2006.01) | |
| *H04L 27/00* | (2006.01) | |
| *H04L 27/02* | (2006.01) | |
| *H04L 25/03* | (2006.01) | |
| *H04L 27/36* | (2006.01) | |
| *H04L 7/00* | (2006.01) | |
| *G06F 11/10* | (2006.01) | |
| *H04B 1/16* | (2006.01) | |
| *H04L 1/20* | (2006.01) | |
| *H04B 1/709* | (2011.01) | |
| *H04L 25/08* | (2006.01) | |
| *H04L 1/00* | (2006.01) | |

(52) U.S. Cl.
CPC .......... *H04B1/709* (2013.01); *H04L 25/03197* (2013.01); *H04L 25/03267* (2013.01); *H04B 2001/0416* (2013.01); *H04L 27/366* (2013.01); *H04L 25/03343* (2013.01); *H04L 25/08* (2013.01); *H04L 1/005* (2013.01); *H04L 1/0054* (2013.01)
USPC ........... 375/232; 375/316; 375/348; 375/346; 375/229; 375/233

(56) References Cited

U.S. PATENT DOCUMENTS

| | | |
|---|---|---|
| 4,797,925 A | 1/1989 | Lin |
| 5,111,484 A | 5/1992 | Karabinis |
| 5,131,011 A | 7/1992 | Bergmans et al. |
| 5,202,903 A | 4/1993 | Okanoue |
| 5,249,200 A | 9/1993 | Chen et al. |
| 5,283,813 A | 2/1994 | Shalvi et al. |
| 5,291,516 A | 3/1994 | Dixon et al. |
| 5,394,439 A | 2/1995 | Hemmati |
| 5,459,762 A | 10/1995 | Wang et al. |
| 5,590,121 A | 12/1996 | Geigel et al. |
| 5,602,507 A | 2/1997 | Suzuki |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 6,009,120 A | 12/1999 | Nobakht |
| 6,167,079 A | 12/2000 | Kinnunen et al. |
| 6,233,709 B1 | 5/2001 | Zhang et al. |
| 6,272,173 B1 | 8/2001 | Hatamian |
| 6,335,954 B1 | 1/2002 | Bottomley et al. |
| 6,516,437 B1 | 2/2003 | Van Stralen et al. |
| 6,532,256 B2 | 3/2003 | Miller |
| 6,535,549 B1 | 3/2003 | Scott et al. |
| 6,697,441 B1 | 2/2004 | Bottomley et al. |
| 6,785,342 B1 | 8/2004 | Isaksen et al. |
| 6,871,208 B1 | 3/2005 | Guo et al. |
| 6,968,021 B1 | 11/2005 | White et al. |
| 6,985,709 B2 | 1/2006 | Perets |
| 7,158,324 B2 | 1/2007 | Stein et al. |
| 7,190,288 B2 | 3/2007 | Robinson et al. |
| 7,190,721 B2 * | 3/2007 | Garrett ........................ 375/232 |
| 7,205,798 B1 | 4/2007 | Agarwal et al. |
| 7,206,363 B2 | 4/2007 | Hegde et al. |
| 7,215,716 B1 | 5/2007 | Smith |
| 7,467,338 B2 | 12/2008 | Saul |
| 7,830,854 B1 | 11/2010 | Sarkar et al. |
| 7,974,230 B1 | 7/2011 | Talley et al. |
| 8,005,170 B2 | 8/2011 | Lee et al. |
| 8,059,737 B2 | 11/2011 | Yang |
| 8,175,186 B1 | 5/2012 | Wiss et al. |
| 8,199,804 B1 | 6/2012 | Cheong |
| 8,248,975 B2 | 8/2012 | Fujita et al. |
| 8,351,536 B2 | 1/2013 | Mazet et al. |
| 8,422,589 B2 | 4/2013 | Golitschek Edler Von Elbwart et al. |
| 8,526,523 B1 | 9/2013 | Eliaz |
| 8,548,072 B1 | 10/2013 | Eliaz |
| 8,548,089 B2 | 10/2013 | Agazzi et al. |
| 8,548,097 B1 | 10/2013 | Eliaz |
| 8,553,821 B1 | 10/2013 | Eliaz |
| 8,559,494 B1 | 10/2013 | Eliaz |
| 8,559,496 B1 * | 10/2013 | Eliaz ........................... 375/232 |
| 8,559,498 B1 | 10/2013 | Eliaz |
| 8,565,363 B1 | 10/2013 | Eliaz |
| 8,566,687 B1 | 10/2013 | Eliaz |
| 8,571,131 B1 | 10/2013 | Eliaz |
| 8,571,146 B1 | 10/2013 | Eliaz |
| 8,572,458 B1 | 10/2013 | Eliaz |
| 8,582,637 B1 | 11/2013 | Eliaz |
| 8,599,914 B1 | 12/2013 | Eliaz |
| 8,605,832 B1 | 12/2013 | Eliaz |
| 8,665,941 B1 | 3/2014 | Eliaz |
| 8,665,992 B1 | 3/2014 | Eliaz |
| 8,666,000 B2 | 3/2014 | Eliaz |
| 8,675,769 B1 | 3/2014 | Eliaz |
| 8,675,782 B2 | 3/2014 | Eliaz |
| 8,681,889 B2 | 3/2014 | Eliaz et al. |
| 8,744,003 B2 | 6/2014 | Eliaz |
| 2001/0008542 A1 | 7/2001 | Wiebke et al. |
| 2002/0016938 A1 | 2/2002 | Starr |
| 2002/0123318 A1 | 9/2002 | Lagarrigue |
| 2002/0150065 A1 | 10/2002 | Ponnekanti |
| 2002/0150184 A1 * | 10/2002 | Hafeez et al. ................. 375/346 |
| 2002/0172297 A1 | 11/2002 | Ouchi et al. |
| 2003/0016741 A1 | 1/2003 | Sasson et al. |
| 2003/0135809 A1 | 7/2003 | Kim |
| 2003/0210352 A1 | 11/2003 | Fitzsimmons et al. |
| 2004/0037374 A1 | 2/2004 | Gonikberg |
| 2004/0086276 A1 | 5/2004 | Lenosky et al. |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0227570 A1 | 11/2004 | Jackson et al. |
| 2004/0240578 A1 | 12/2004 | Thesling |
| 2004/0257955 A1 | 12/2004 | Yamanaka et al. |
| 2005/0047517 A1 | 3/2005 | Georgios et al. |
| 2005/0123077 A1 | 6/2005 | Kim |
| 2005/0135472 A1 | 6/2005 | Higashino |
| 2005/0220218 A1 | 10/2005 | Jensen et al. |
| 2005/0265470 A1 | 12/2005 | Kishigami et al. |
| 2005/0276317 A1 | 12/2005 | Jeong et al. |
| 2006/0067396 A1 | 3/2006 | Christensen |
| 2006/0109780 A1 | 5/2006 | Fechtel |
| 2006/0171489 A1 | 8/2006 | Ghosh et al. |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0092017 A1 | 4/2007 | Abedi |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0069274 A1 * | 3/2008 | Kopmeiners et al. ......... 375/341 |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |

(56) References Cited

U.S. PATENT DOCUMENTS

| | | |
|---|---|---|
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | McKown |
| 2009/0213908 A1 | 8/2009 | Bottomley |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0208774 A1 | 8/2010 | Guess et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0074500 A1 | 3/2011 | Bouillet et al. |
| 2011/0074506 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0121257 A1 | 5/2013 | He et al. |
| 2013/0266098 A1* | 10/2013 | McKown ............ 375/346 |

OTHER PUBLICATIONS

Int'l Search Report and Written Opinion for PCT/IB2013/001923 dated Mar. 21, 2014.
Int'l Search Report and Written Opinion for PCT/IB2013/001878 dated Mar. 21, 2014.
Int'l Search Report and Written Opinion for PCT/IB2013/002383 dated Mar. 21, 2014.
Int'l Search Report and Written Opinion for PCT/IB2013/01860 dated Mar. 21, 2014.
Equalization: The Correction and Analysis of Degraded Signals, White Paper, Agilent Technologies, Ransom Stephens V1.0, Aug. 15, 2005 (12 pages).
Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).
R. A. Gibby and J. W. Smith, "Some extensions of Nyquist's telegraph transmission theory," Bell Syst. Tech. J., vol. 44, pp. 1487-1510, Sep. 1965.
J. E. Mazo and H. J. Landau, "On the minimum distance problem for faster-than-Nyquist signaling," IEEE Trans. Inform. Theory, vol. 34, pp. 1420-1427, Nov. 1988.
D. Hajela, "On computing the minimum distance for faster than Nyquist signaling," IEEE Trans. Inform. Theory, vol. 36, pp. 289-295, Mar. 1990.
G. Ungerboeck, "Adaptive maximum-likelihood receiver for carrier modulated data-transmission systems," IEEE Trans. Commun., vol. 22, No. 5, pp. 624-636, May 1974.
G. D. Forney, Jr., "Maximum-likelihood sequence estimation of digital sequences in the presence of intersymbol interference," IEEE Trans. Inform. Theory, vol. 18, No. 2, pp. 363-378, May 1972.
A. Duel-Hallen and C. Heegard, "Delayed decision-feedback sequence estimation," IEEE Trans. Commun., vol. 37, pp. 428-436, May 1989.
M. V. Eyubog •Iu and S. U. Qureshi, "Reduced-state sequence estimation with set partitioning and decision feedback," IEEE Trans. Commun., vol. 36, pp. 13-20, Jan. 1988.
W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.
W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.
S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.
Miao, George J., Signal Processing for Digital Communications, 2006, Artech House, pp. 375-377.
Xiong, Fuqin. Digital Modulation Techniques, Artech House, 2006, Chapter 9, pp. 447-483.
Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).
Stefano Tomasin, et al. "Iterative Interference Cancellation and Channel Estimation for Mobile OFDM", IEEE Transactions on Wireless Communications, vol. 4, No. 1, Jan. 2005, pp. 238-245.
Int'l Search Report and Written Opinion for PCT/IB2013/01970 dated Mar. 27, 2014.
Int'l Search Report and Written Opinion for PCT/IB2013/01930 dated May 15, 2014.
Int'l Search Report and Written Opinion for PCT/IB2013/02081 dated May 22, 2014.

* cited by examiner

SIGNAL RECEPTION USING NON-LINEARITY-COMPENSATED, PARTIAL RESPONSE FEEDBACK

CLAIM OF PRIORITY

This patent application is a continuation of U.S. patent application Ser. No. 13/755,014 filed on Jan. 31, 2013 (now U.S. Pat. No. 8,559,496), which in turn, claims priority to U.S. Provisional Patent Application Ser. No. 61/662,085 entitled "Apparatus and Method for Efficient Utilization of Bandwidth" and filed on Jun. 20, 2012. This patent application is also a non-provisional of U.S. Provisional Patent Application Ser. No. 61/726,099 entitled "Modulation Scheme Based on Partial Response" and filed on Nov. 14, 2012, U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above-identified applications is hereby incorporated herein by reference in its entirety.

INCORPORATION BY REFERENCE

This patent application also makes reference to:
U.S. patent application Ser. No. 13/754,964 (now patented as U.S. Pat. No. 8,582,637), titled "Low-Complexity, Highly-Spectrally-Efficient Communications," and filed on the same date as this application;
U.S. patent application Ser. No. 13/754,998, titled "Design and Optimization of Partial Response Pulse Shape Filter," and filed on the same date as this application;
U.S. patent application Ser. No. 13/755,001, titled "Constellation Map Optimization For Highly Spectrally Efficient Communications," and filed on the same date as this application;
U.S. patent application Ser. No. 13/755,008 (now patented as U.S. Pat. No. 8,571,131), titled "Dynamic Filter Adjustment for Highly-Spectrally-Efficient Communications," and filed on the same date as this application;
U.S. patent application Ser. No. 13/755,011 (now patented as U.S. Pat. No. 8,559,494), titled "Timing Synchronization for Reception of Highly-Spectrally-Efficient Communications," and filed on the same date as this application;
U.S. patent application Ser. No. 13/755,018 (now patented as U.S. Pat. No. 8,599,914), titled "Feed Forward Equalization for Highly-Spectrally-Efficient Communications," and filed on the same date as this application;
U.S. patent application Ser. No. 13/755,021, titled "Decision Feedback Equalizer for Highly-Spectrally-Efficient Communications," and filed on the same date as this application;
U.S. patent application Ser. No. 13/755,025, titled "Decision Feedback Equalizer with Multiple Cores for Highly-Spectrally-Efficient Communications," and filed on the same date as this application;
U.S. patent application Ser. No. 13/755,026 (now patented as U.S. Pat. No. 8,559,498), titled "Decision Feedback Equalizer Utilizing Symbol Error Rate Biased Adaptation Function for Highly-Spectrally-Efficient Communications," and filed on the same date as this application;
U.S. patent application Ser. No. 13/755,028 (now patented as U.S. Pat. No. 8,548,097), titled "Coarse Phase Estimation for Highly-Spectrally-Efficient Communications," and filed on the same date as this application;
U.S. patent application Ser. No. 13/755,039 (now patented as U.S. Pat. No. 8,565,363), titled "Fine Phase Estimation for Highly Spectrally Efficient Communications," and filed on the same date as this application; and
U.S. patent application Ser. No. 13/755,043 (now patented as U.S. Pat. No. 8,605,832), titled "Joint Sequence Estimation of Symbol and Phase with High Tolerance of Nonlinearity," and filed on the same date as this application.

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for signal reception using non-linearity-compensated, partial response feedback, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
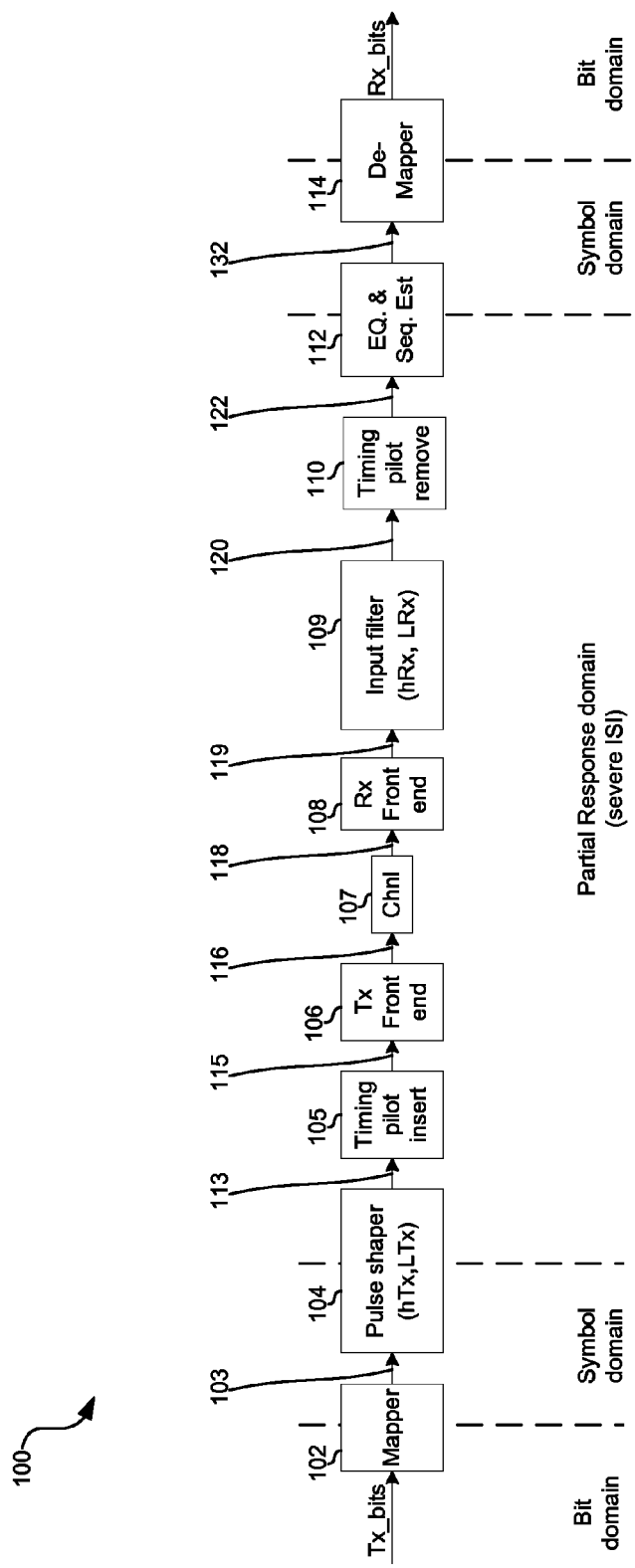
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the pulse shaper 109 may be configured based on: a non-linearity model, Fnl, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. The equalizer may utilize a least mean square (LMS) algorithm that attempts minimize the least mean square of an error between the partial response feedback signal 203 and the equalizer output 222. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) dedecoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where LLR (b)=$\log(P_b/1-P_b)$, where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
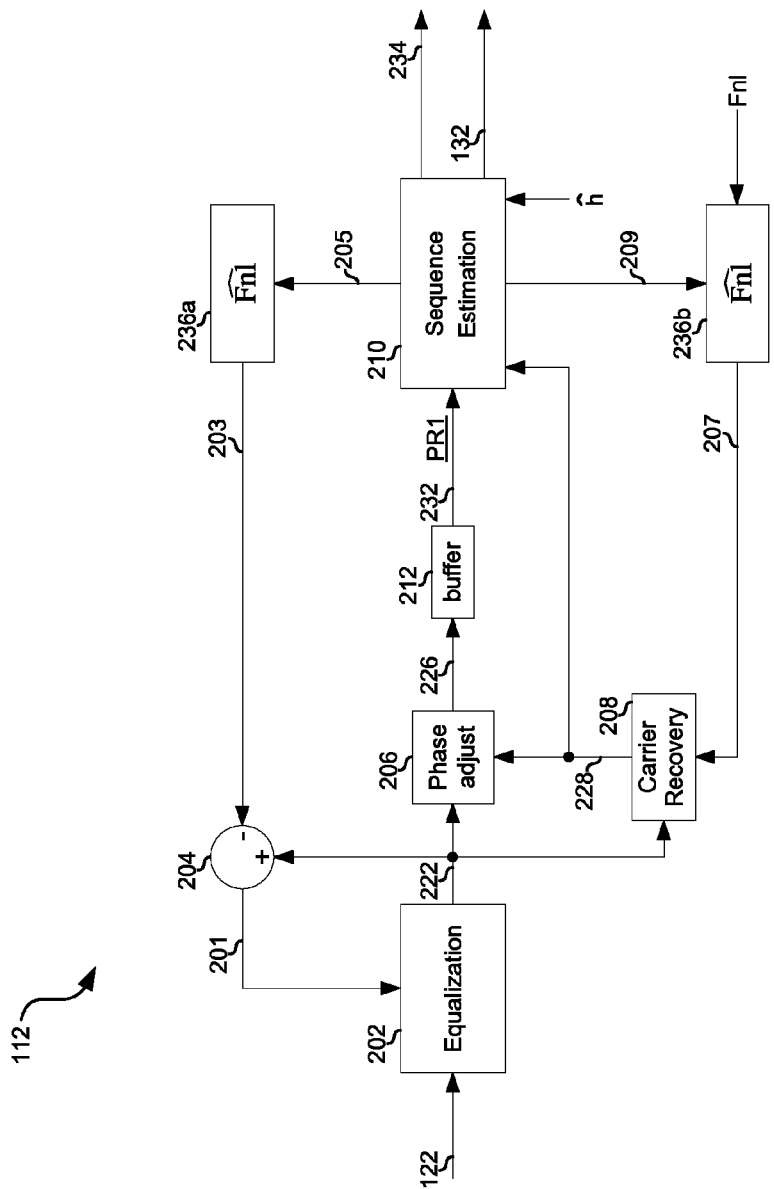
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response ĥ. Response ĥ is based on h (the total partial response, discussed above). For example, response ĥ may represent a compromise between h (described above) and a filter response that compensates for channel non-idealities such as multi-path. The response ĥ may be conveyed and/or stored in the form of LTx+LRx−1 tap coefficients resulting from convolution of the LTx tap coefficients of the pulse shaper 104 and the LRx tap coefficients of the input filter 109. Alternatively, response ĥ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
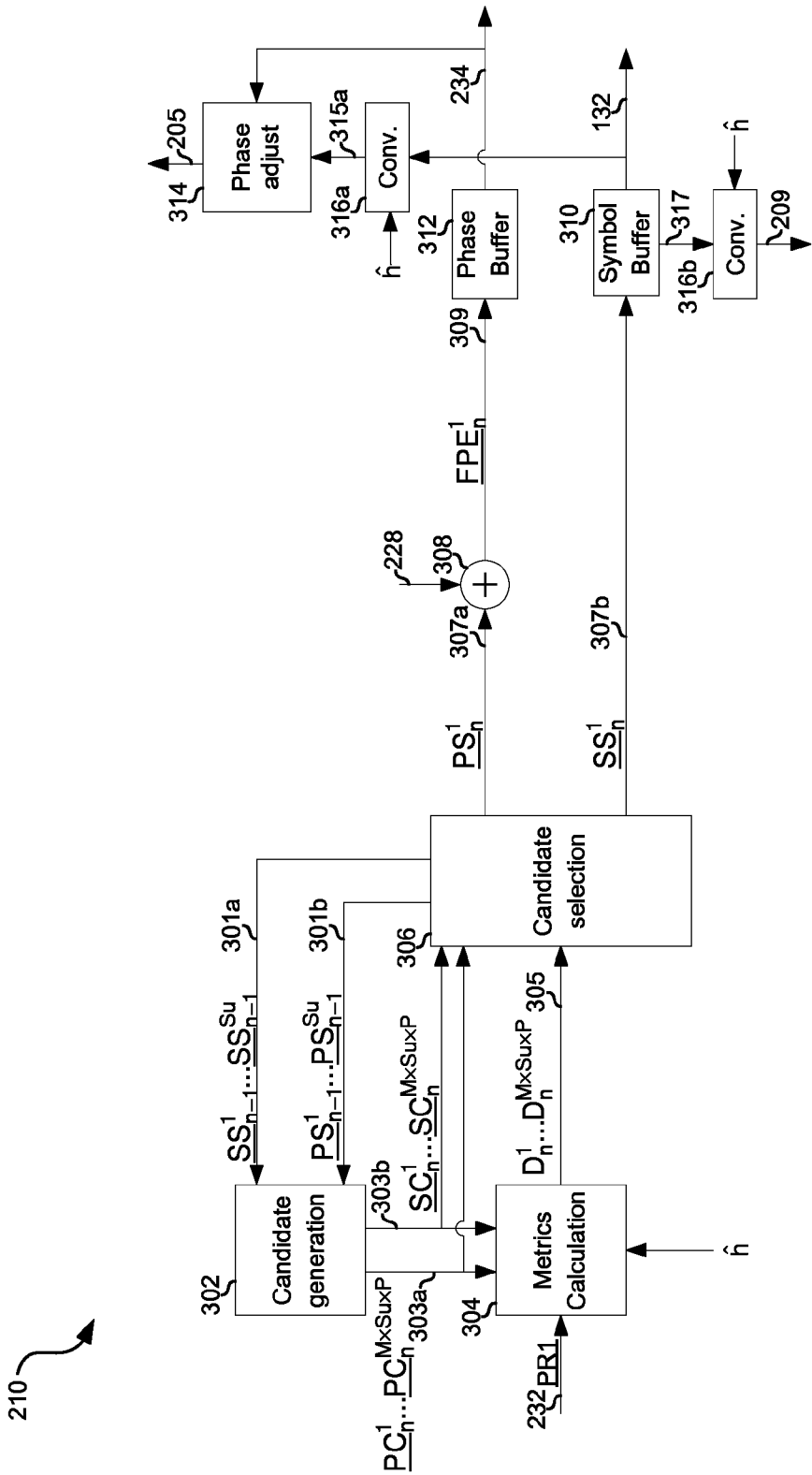
FIG. 3 is a block diagram depicting an example sequence estimation circuit for use in a system configured for low-complexity, highly-spectrally-efficient communications.

The non-linear modeling circuit 236a may apply a non-linearity function Fñl (a model of the non-linearity seen by the received signal en route to the circuit 210) to the signal 205 resulting in the signal 203. Similarly, the non-linear modeling circuit 236b may apply the non-linearity function Fñl to the signal 209 resulting in the signal 207. Fñl may be, for example, a third-order or fifth-order polynomial. Increased accuracy resulting from the use of a higher-order polynomial for Fñl may tradeoff with increased complexity of implementing a higher-order polynomial. Where FnlTx is the dominant non-linearity of the communication system 100, Fñl modeling only FnlTx may be sufficient. Where degradation in receiver performance is above a threshold due to other non-linearities in the system (e.g., non-linearity of the receiver front-end 108) the model Fñl may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$ and the signal 303b conveying the symbol candidate vectors $SC_n^1 \ldots SC_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below with respect to FIGS. 5A-5D and in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols. An example implementation of the metrics calculation block is described below with reference to FIG. 4.

The candidate selection circuit 306 may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described below with reference to FIGS. 5A and 5B and/or in the United States patent application titled "Joint Sequence Estimation of Symbol and Phase with High Tolerance of Nonlinearity," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described below with reference to FIGS. 8A and 8B, respectively.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response ĥ, resulting in the partial response signal 315a. Similarly, the convolution circuit 316b may be operable to convolve the signal 317 with response ĥ, resulting in the partial response signal 209. As noted above, response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response ĥ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
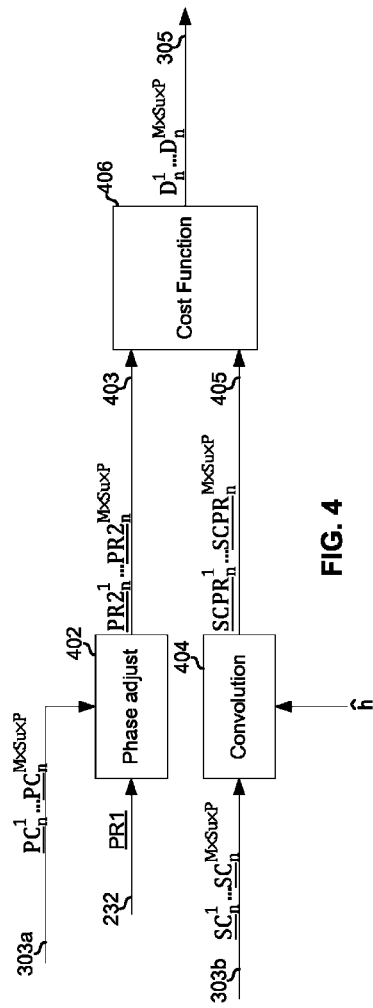
FIG. 4 is a block diagram depicting an example metric calculation circuit for use in a system configured for low-complexity, highly-spectrally-efficient communications.

FIG. 4 is a block diagram depicting an example metric calculation circuit for use in a system configured for low-complexity, highly-spectrally-efficient communications. Shown is a phase adjust circuit 402, a convolution circuit 404, and a cost function calculation circuit 406. The phase adjust circuit 402 may phase shift one or more elements of the vector PR1 (conveyed via signal 232) by a corresponding one or more values of the phase candidate vectors $PC_n^1 \ldots PC_n^{M \times Su \times P}$. The signal 403 output by the phase adjust circuit 402 thus conveys a plurality of partial response vectors $PR2_n^1 \ldots PR2_n^{M \times Su \times P}$ each of which comprises a plurality of phase-adjusted versions of PR1.

The circuit 404, which performs a convolution, may comprise a FIR filter or IIR filter, for example. The circuit 404 may be operable to convolve the symbol candidate vectors $SC_n^1 \ldots SC_n^{M \times Su \times P}$ with ĥ. The signal 405 output by the circuit 404 thus conveys vectors $SCPR_n^1 \ldots SCPR_n^{M \times Su \times P}$, each of which is a candidate partial response vector.

The cost function circuit 406 may be operable to generate metrics indicating the similarity between one or more of the partial response vectors $PR2_n^1 \ldots PR2_n^{M \times Su \times P}$ and one or more of the vectors $SCPR_n^1 \ldots SCPR_n^{M \times Su \times P}$ to generate error metrics $D_n^1 \ldots D_n^{M \times Su \times P}$.

In an example implementation, the error metrics may be Euclidean distances calculated as shown below in equation 1.

$$D_n^i = |(SCPR_n^i) - (PR2_n^i)|^2 \qquad \text{EQ. 1}$$

for $1 \leq i \leq M \times Su \times P$.

FIGS. 5A-5D depict portions of an example sequence estimation process performed by a system configured for low-complexity, highly-spectrally-efficient communications. In FIGS. 5A-5D it is assumed, for purposes of illustration, that M=4 (a symbol alphabet of α,β,χ,δ), Su=3 (three symbol survivors are selected each iteration), Psu=Su (three phase survivors are selected each iteration), P=3 (a phase alphabet of plus, minus, and zero), and that Q (vector length) is 4.

Figure 5A:
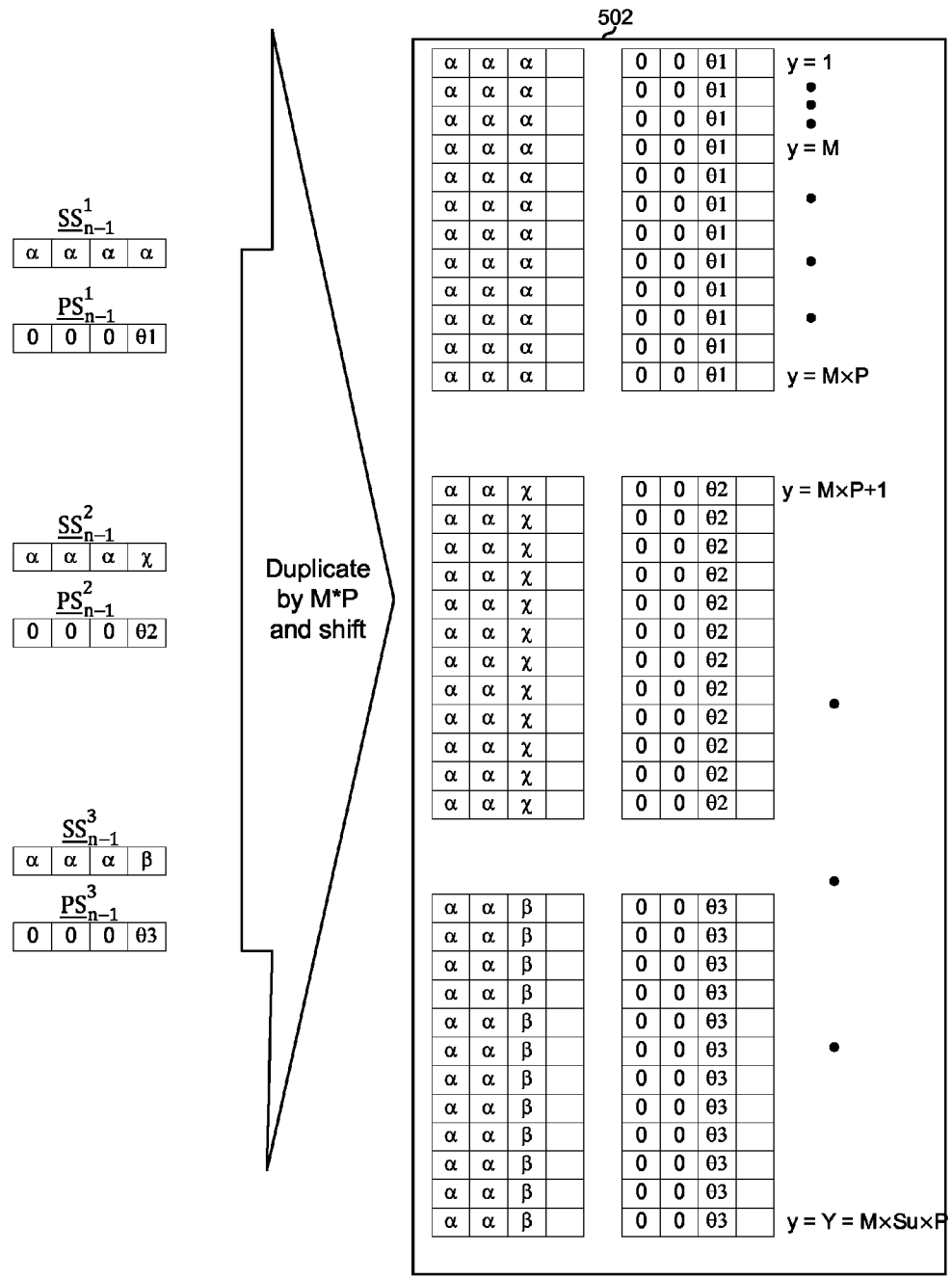
FIGS. 5A-5D depict portions of an example sequence estimation process performed by a system configured for low-complexity, highly-spectrally-efficient communications.

Referring to FIG. 5A, there is shown phase and symbol survivors from time n−1 on the left side of the figure. The first step in generating symbol candidates and phase candidates from the survivors is to duplicate the survivors and shift the contents to free up an element in each of the resulting vectors called out as 502 on the right side of FIG. 5A. In the example implementation depicted, the survivors are duplicated M*P−1 times and shifted one element.

Figure 5B:
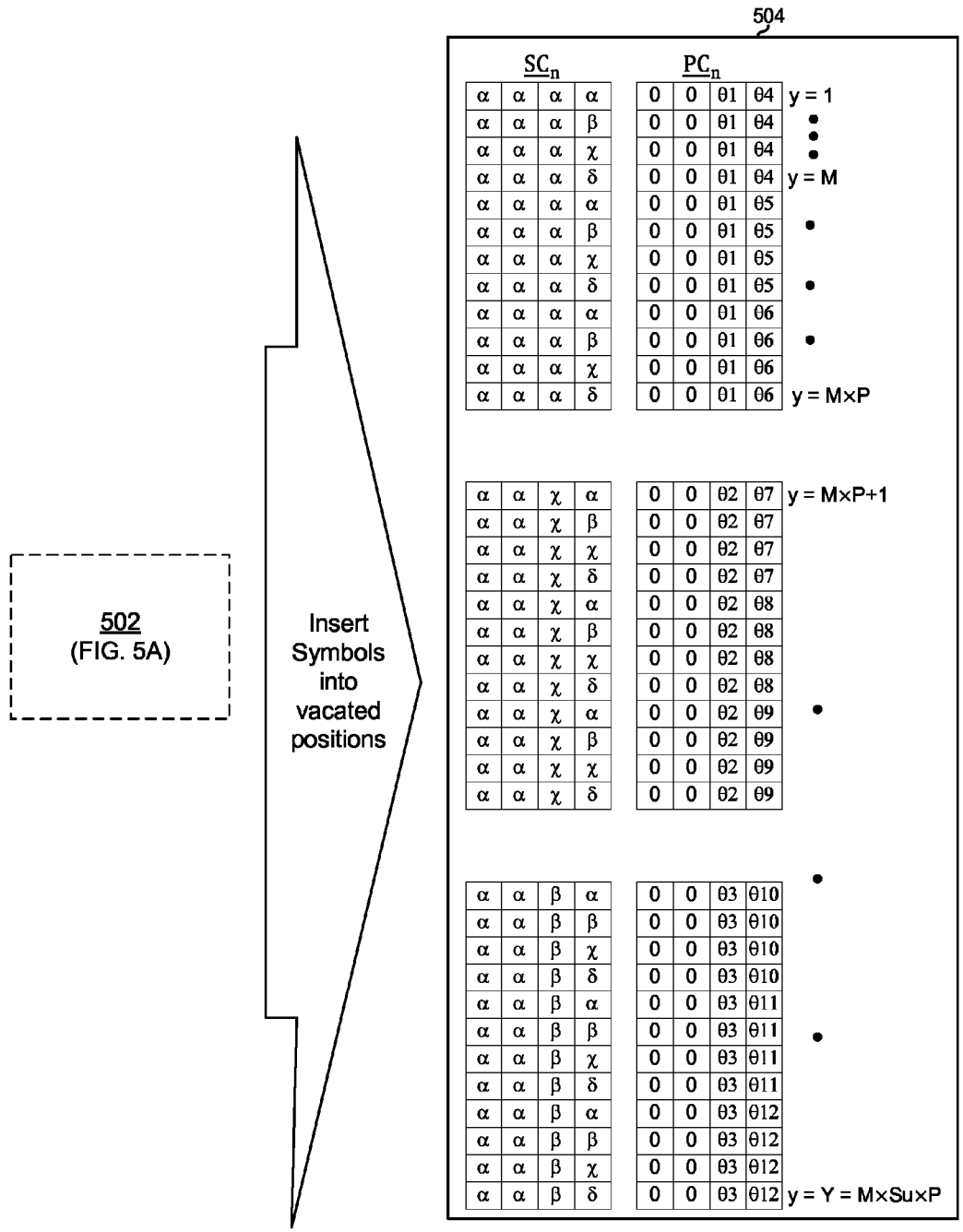

Referring to FIG. 5B, the next step in generating the candidates is inserting symbols in the vacant elements of the symbol vectors and phase values in the vacant elements of the phase vectors, resulting in the symbol candidates and phase candidate for time n (called out as 504 in FIG. 5B). In the example implementation depicted, each of the M possible symbol values is inserted into Su*P symbol candidates, and each of the P phase values may be inserted into M*Su candidates. In the example implementation depicted, θ5 is a reference phase value calculated based on phase survivor $PS_{n-1}^1$. For example, θ5 may be the average (or a weighted average) of the last two or more elements of the phase survivor $PS_{n-1}^1$ (in the example shown, the average over the last two elements would be (θ5+0)/2). In the example implementation depicted, θ4=θ5−Δθ, and θ6=θ5+Δθ, where Δθ is based on: the amount of phase noise in signal 226, slope (derivative) of the phase noise in signal 226, signal-to-noise ratio (SNR) of signal 226, and/or capacity of the channel 107. Similarly, in the example implementation shown, θ8 is a reference phase value calculated based on phase survivor $PS_{n-1}^2$, θ7=θ8−Δθ, θ9=θ8+Δθ, θ11 is a reference phase value calculated based on phase survivor $PS_{n-1}^3$, θ10=θ11−Δθ, and θ12=θ11+Δθ.

Figure 5C:
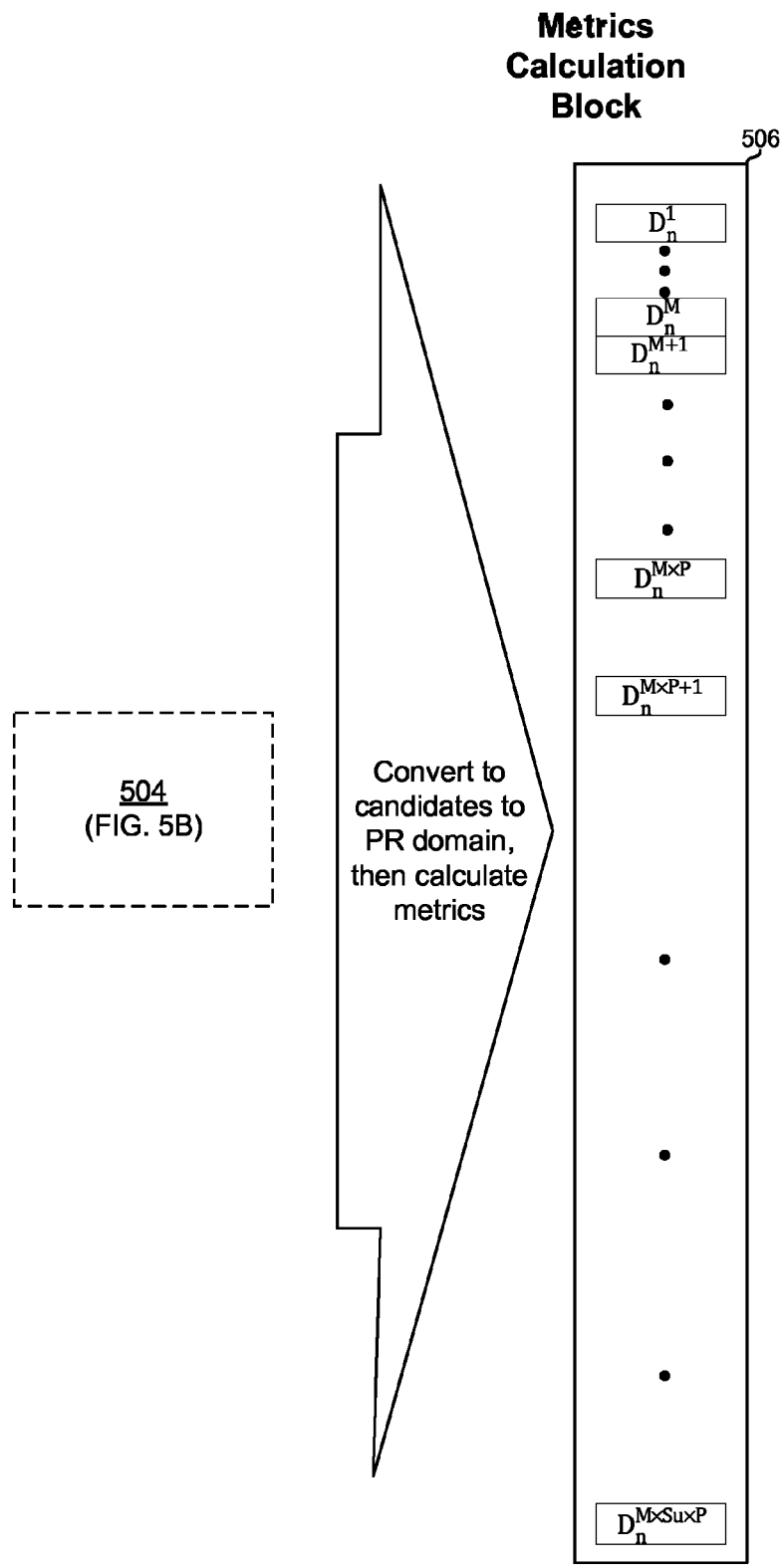

Referring to FIG. 5C, as described above with reference to FIG. 4, the symbol candidates are transformed to the partial response domain via a convolution, the reference signal PR1 is phase adjusted, and then the metrics $D_n^1 \ldots D_n^{M \times Su \times P}$ are calculated based on the partial response signals $PR2_n^1 \ldots PR2_n^{M \times Su \times P}$ and $SCPR_n^1 \ldots SCPR_n^{M \times Su \times P}$.

Figure 5D:
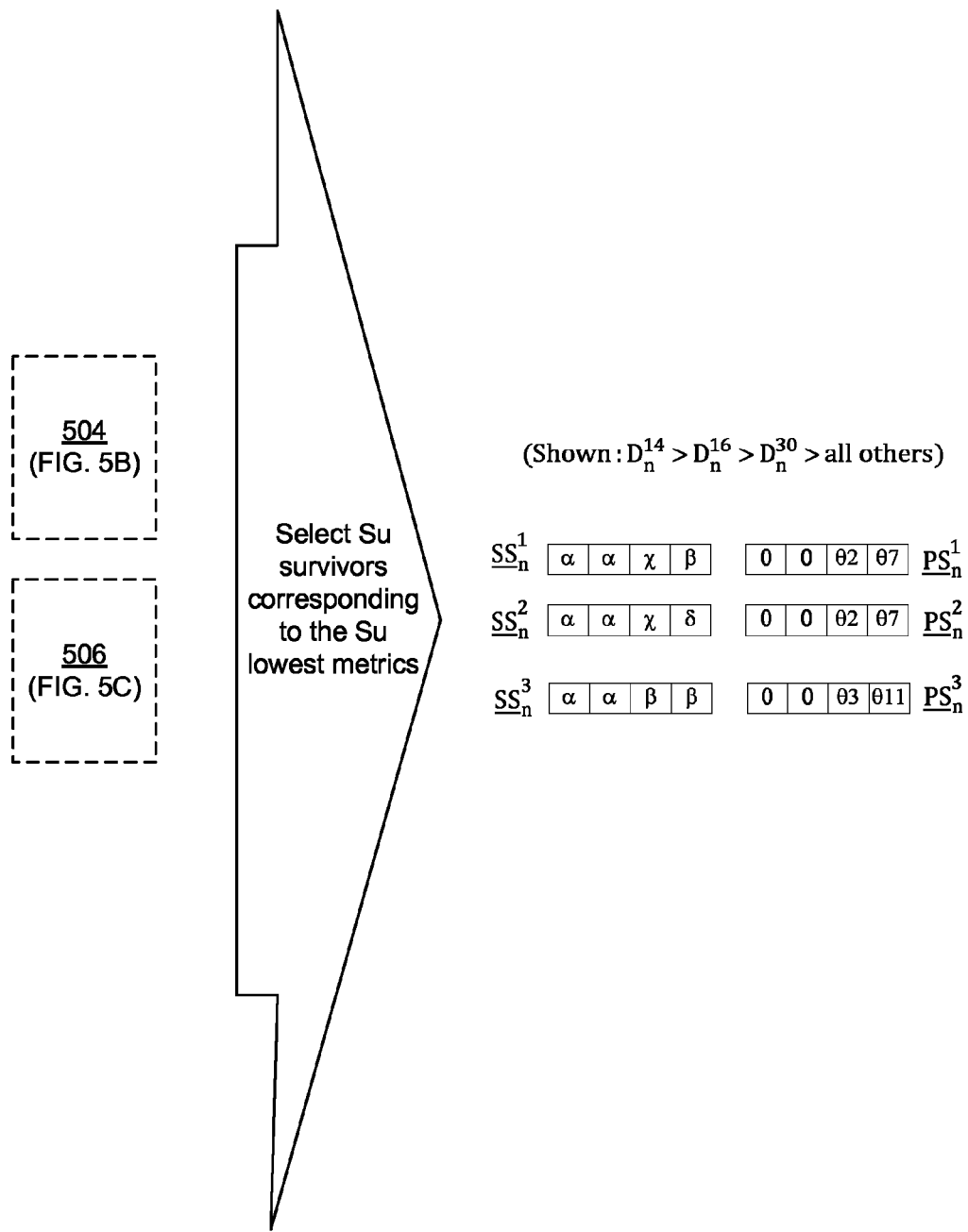

Referring to FIG. 5D, the metrics calculated in FIG. 5C are used to select which of the candidates generated in FIG. 5B are selected to be the survivors for the next iteration of the sequence estimation process. FIG. 5D depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5D may result in selecting identical symbol candidates which may be undesirable. A survivor selection process that prevents redundant symbol survivors is described below with reference to FIGS. 6A and 6B.

Figure 6A:
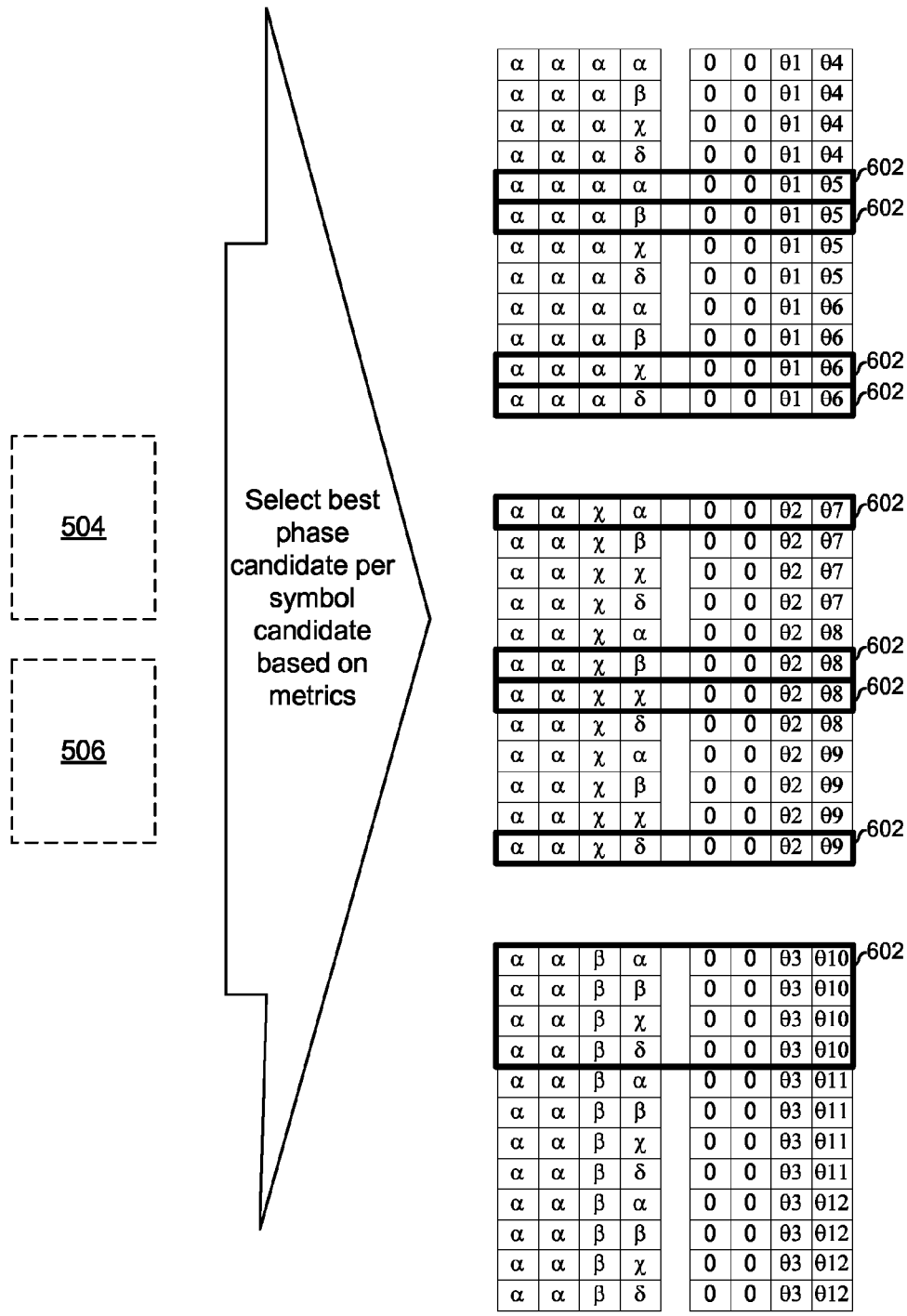
FIGS. 6A and 6B depict an example survivor selection process that is an alternative to the process depicted in FIG. 5D.
Figure 6B:
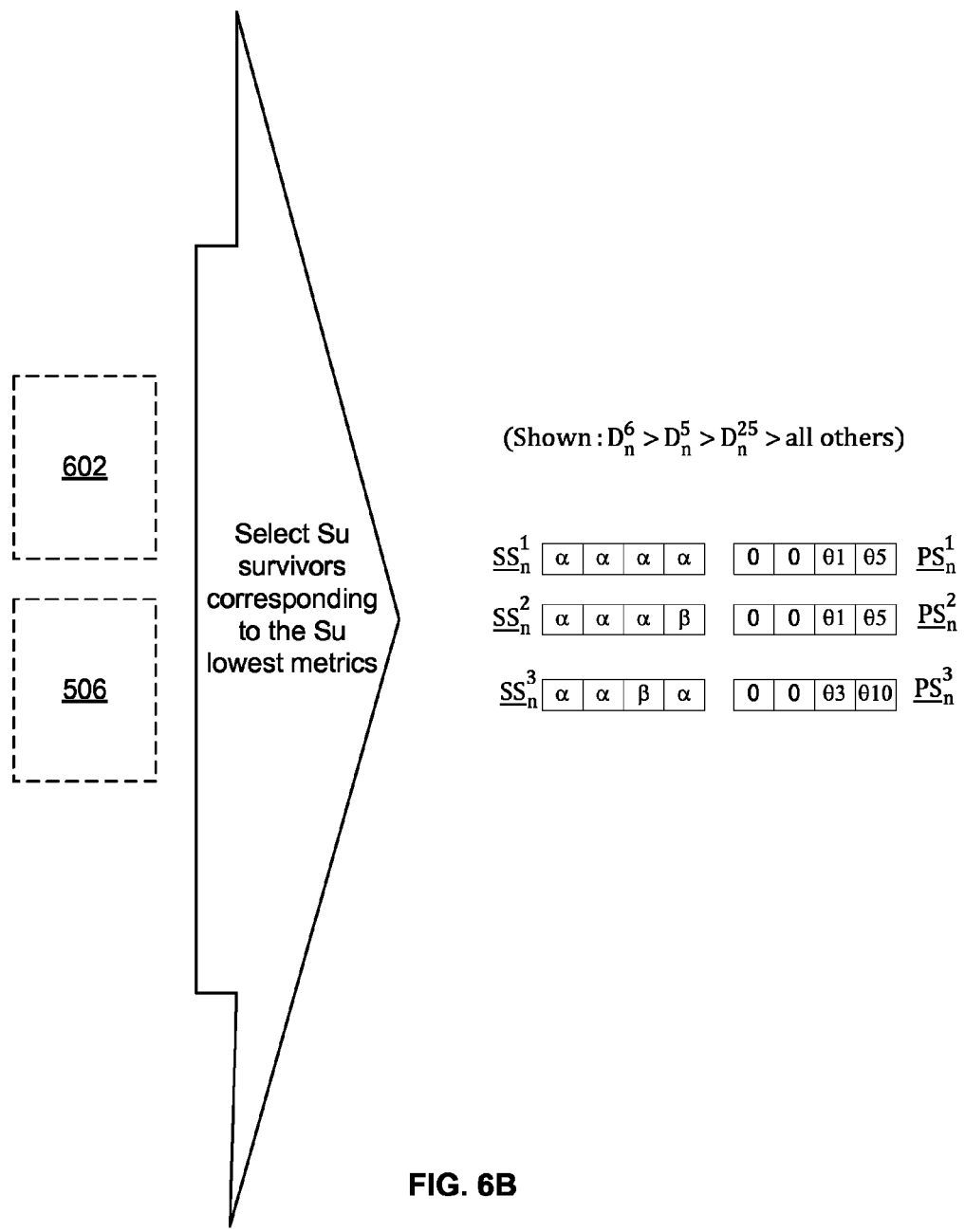

FIGS. 6A and 6B depict an example survivor selection process that is an alternative to the process depicted in FIG. 5D. In FIG. 6A, the candidates generated in FIG. 5B and the metrics calculated in FIG. 5C are used to select the best phase candidate for each symbol candidate (selected candidates are called out by reference designator 602). In FIG. 6B, the best Su of the candidates selected in FIG. 6A are selected as the survivors for the next iteration of the sequence estimation process. In the example implementation depicted, it is assumed that metric $D_n^6$ is the best metric, that $D_n^5$ is the second-best metric, and that $D_n^{25}$ is the third-best metric. Accordingly, symbol candidate $SC_n^6$ is selected as the best symbol survivor, $PC_n^6$ is selected as the best phase survivor, symbol candidate $SC_n^5$ is selected as the second-best symbol survivor, $PC_n^5$ is selected as the second-best phase survivor, symbol candidate $SC_n^{25}$ is selected as the third-best symbol survivor, and $PC_n^{25}$ is selected as the third-best phase survivor. Although the implementations described with reference to FIGS. 5A-6B use one phase survivor per symbol survivor. Other example implementations may use PSu (e.g., PSu<Su) phase survivors that are used commonly for each symbol survivor. In such an implementation, each of the phase survivors $PS_{n-1}^1 \ldots PS_{n-1}^{PSu}$ may be duplicated P times to generate phase successors, and then duplicated M*Su times to be associated with corresponding symbols successors. The number of symbol candidates in such an implementation would be M*Su*PSu*P.

Figure 7:
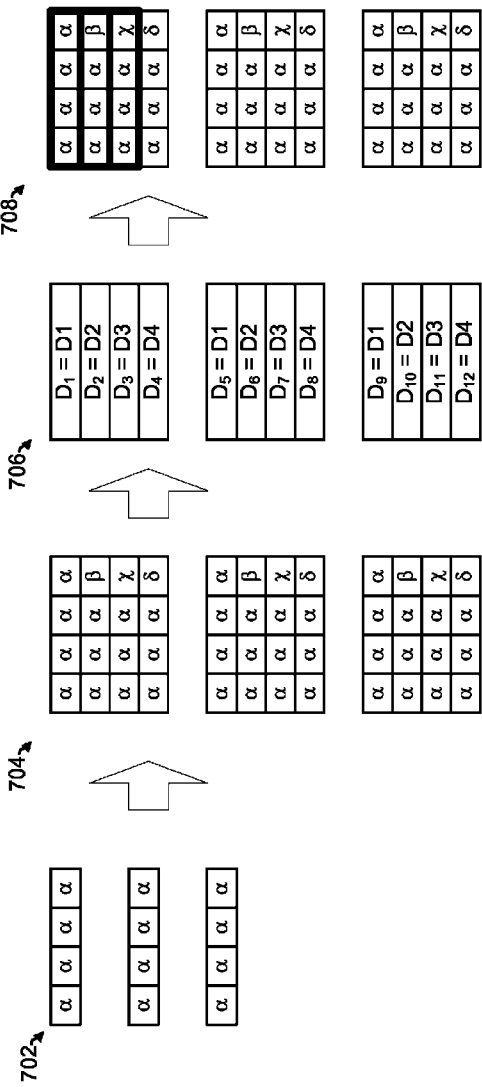
FIG. 7 is a diagram illustrating initialization of the sequence estimation process.

FIG. 7 is a diagram illustrating initialization of the sequence estimation process. In FIG. 7 it is again assumed, for illustration, that M=4 (a symbol alphabet of α,β,χ,δ), Su=3 (three symbol survivors are selected each iteration), Psu=Su (three phase survivors are selected each iteration), P=3 (a phase alphabet of plus, minus, and zero), and that Q (vector length) is 4. On the far left of FIG. 7 is shown symbol survivors 702 after receipt of a preamble sequence. Because the preamble is a deterministic sequence, all symbol survivors are forced to the same values. From the survivors 702 are generated the candidates 704 and metrics 706 are calculated based on the candidates 704. In the example implementation shown, since the survivors were all the same, there are only four unique symbol candidates. The metrics for the four candidates are, respectively, D1, D2, D3, and D4. Accordingly, if the three candidates corresponding to the best three metrics were chosen, then the three candidates corresponding to D1 would all be chosen and the survivors for the next iteration would again all be identical. Accordingly, the three best, non-redundant symbol candidates are selected (as indicated by the heavy lines). Consequently, one of the candidates having the metric value D1 is selected, one of the candidates having the metric value D2 is selected, and one of the candidates having metric value D3 is selected, such that three non-redundant survivors are used for the next iteration.

Figure 8A:
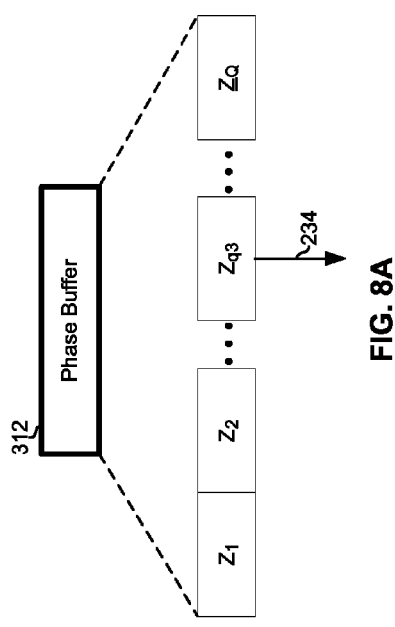
FIG. 8A depicts an example implementation of the phase buffer shown in FIG. 3.

FIG. 8A depicts an example implementation of the phase buffer shown in FIG. 3. In the example implementation depicted, the depth of the phase buffer 312 is Q and the phase value stored at element q is represented as $Z_q$, for q from 1 to Q. In the example implementation depicted, the value stored in element q3 is output as the signal 234. For each iteration of the sequence estimation process, Q elements of the phase buffer 312 storing Q values of $PS_{n-1}^1$ may be overwritten with Q values of $PS_n^1$.

Figure 8B:
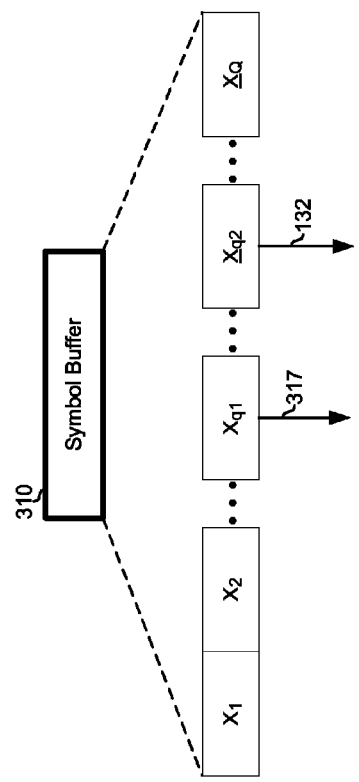
FIG. 8B depicts an example implementation of the symbol buffer shown in FIG. 3.

FIG. 8B depicts an example implementation of the symbol buffer shown in FIG. 3. In the example implementation depicted, the depth of the symbol buffer 310 is Q and the symbol value stored at element q is represented as $X_q$, for q from 1 to Q. For each iteration of the sequence estimation process, Q elements of the symbol buffer 310 storing Q values of $SS_{n-1}^1$ may be overwritten with Q values of $SS_n^1$. In the example implementation depicted, the value(s) stored in one or more elements starting with index q1 (e.g., values stored in elements q1 through q1+L−1) is/are output as the signal 317 and the value(s) stored in one or more elements starting with index q2 (e.g., values stored in elements q2 through q2+L−1) is/are output as the signal 132. Because the value(s) output as the signal 317 start from a lower-indexed element of the symbol buffer, the delay between receiving a signal sample and outputting the corresponding value of signal 317 is shorter than the delay between receiving a signal sample and outputting the corresponding value of the signal 132. Because the value(s) output as the signal 132 start from a higher-indexed element, however, it/they is/are likely to be less error-prone. These concepts are further illustrated with reference to in FIGS. 8C and 8D. In an example implementation, q2 is equal to q3.

Figure 8C:
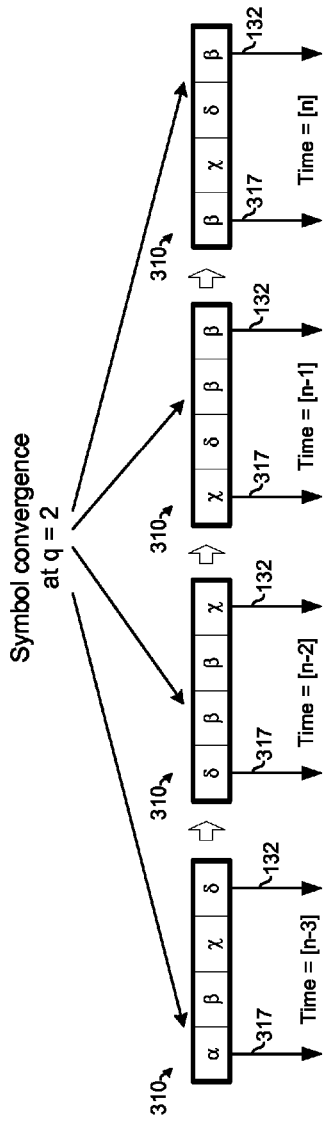
FIG. 8C depicts contents of an example symbol buffer over a plurality of iterations of a sequence estimation process.

FIG. 8C depicts contents of an example symbol buffer over a plurality of iterations of a sequence estimation process. In the example implementation shown in FIG. 8C, the symbol buffer 310 comprises four elements with the signal 317 corresponding to the contents of the first element (for simplicity of illustration, in FIGS. 8C and 8D, it is assumed only one element is output as signal 317 on each iteration) and the signal 132 corresponding to the fourth element (for simplicity of illustration, in FIGS. 8C and 8D, it is assumed only one element is output as signal 132 on each iteration). In the example implementation depicted, during each iteration of the sequence estimation process, candidates are generated by duplicating the survivors from the previous iteration, shifting the values by one element, and the appending a new value into the vacated element. Accordingly, ideally each survivor would differ from the previous survivor only in the lowest-indexed element (corresponding to the most-recent symbol). Where other elements of the most-recent survivor differ from corresponding elements of the previous survivor, such difference indicates that there is an error in those elements (either in the most-recent survivor or in the previous survivor). Given the convolutional nature of the partial response signal, symbols at higher indexes in the buffer are more reliable. Thus the symbol values will tend to converge as they move toward the right in FIG. 8C.

Figure 8D:
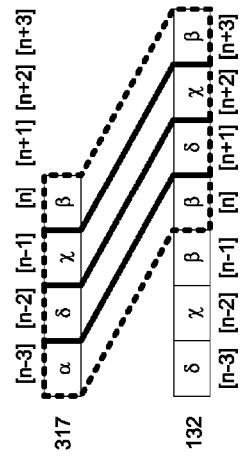
FIG. 8D depicts generated signals corresponding to the symbol buffer contents shown in FIG. 8C.

Shown are the contents of example symbol buffer 310 at times n−3, n−2, n−1, and n. At time n−3, a symbol survivor having values α,β,χ,δ is stored in the symbol buffer 310. Accordingly, as shown in FIG. 8D, the value of signal 317 at time n−3 is 'α' and the value of signal 132 is 'δ.' At time n−2, a new symbol survivor having values δ,β,β,χ is stored in the symbol buffer 310. Accordingly, as shown in FIG. 8D, the value of signal 317 at time n−2 is 'δ' and the value of signal 132 is 'χ.' At time n−1, a new symbol survivor having values χ,δ,β,β is stored in the symbol buffer 310. Accordingly, as shown in FIG. 8D, the value of signal 317 at time n−1 is 'χ' and the value of signal 132 is 'β.' At time n, a new symbol survivor having values β,χ,δ,β is stored in the symbol buffer 310. Accordingly, as shown in FIG. 8D, the value of signal 317 at time n is 'β' and the value of signal 132 is 'β.' Thus, in the example scenario depicted in FIG. 8C, the value in the first element of the symbol buffer 310 at time n−3 was erroneous and the symbol did not converge until it reached the second element (q=2) of the buffer 310. That is, at time n−2 the symbol changed from α to β and then remained β at times n−1 and n. This illustrates the consequence of taking signal 317 from the first element of the symbol buffer 310 and taking the signal 132 from the fourth element of the symbol buffer 312. Namely, the signal 317 has less delay than the signal 132 but is also more error prone than the signal 132.

In FIG. 8D, the values of the signals are shown for times n−3 to time n+3. The dashed lines illustrate the delay between the signal 317 and the signal 132.

Figure 9A:
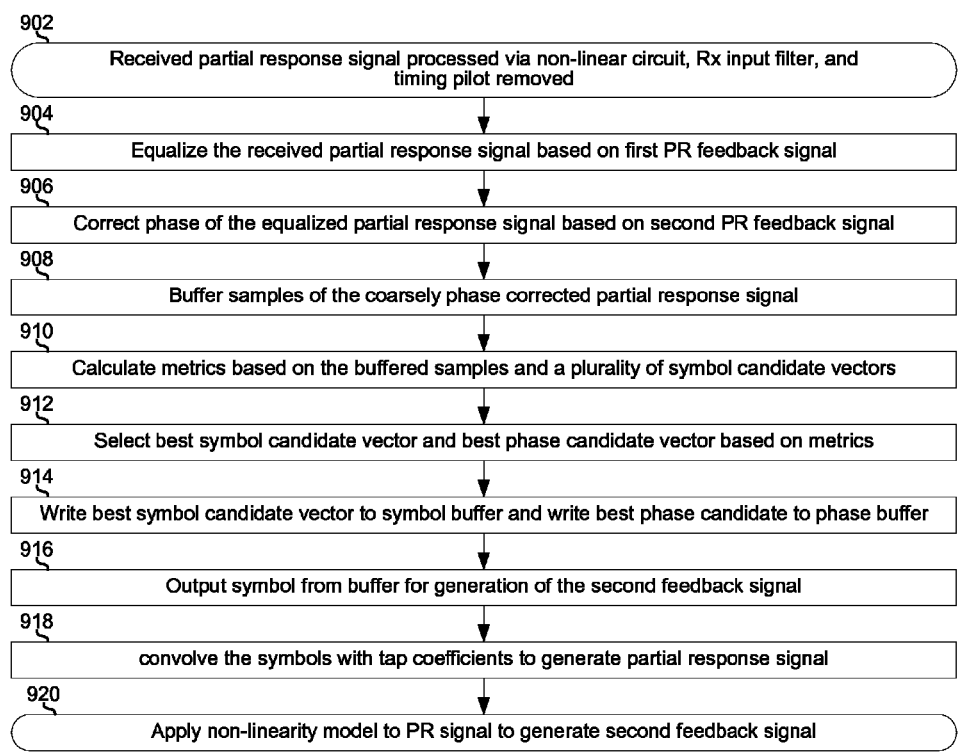
FIG. 9A is a flowchart illustrating an example process for carrier recovery and phase error correction using a partial response feedback signal.

FIG. 9A is a flowchart illustrating an example process for carrier recovery and phase error correction using a partial response feedback signal. The process begins with block 902 in which a received partial response signal is processed via a non-linear circuit (e.g., front-end 108), via an input filter (e.g., filter 109) and a timing pilot removal circuit (e.g., circuit 110). In block 904, the signal resulting from the processing of block 902 is equalized (e.g., via equalizer 202), where the equalization is based on a first partial response feedback signal (e.g., signal 201). In block 906, the phase error of the equalized partial response signal is corrected (e.g., via phase adjust circuit 206) based on a second partial response feedback signal (e.g., signal 207). In block 908, samples of the phase corrected partial response (e.g., sampled at the symbol frequency) are buffered (e.g., in buffer 212). In block 910, the buffered samples are input to a sequence estimation process (e.g., performed by sequence estimation circuit 112) in which metrics are calculated based on the buffered samples of the phase corrected partial response signal (e.g., PR1) and based on a plurality of symbol candidates (e.g., $SC_n^1 \ldots SC_n^{M \times Su \times P}$) and one or more phase candidates (e.g., $PC_n^1 \ldots PC_n^{M \times Su \times P}$). In block 912, a best symbol candidate and best phase candidate are selected based on the calculated metrics. In block 914, the best symbol candidate is written to a symbol buffer (e.g., buffer 310) and the best phase candidate is written to a phase buffer (e.g., buffer 312). In block 916, a vector of one or more symbols stored in the symbol buffer 310 (e.g., L symbols beginning at index q1) is output for generation of the second feedback signal. In block 918, the vector output in block 916 is convolved (e.g., by circuit 316b) with tap coefficients (e.g., tap coefficients corresponding to response ĥ) to generate a partial response signal (e.g., signals 209). In block 920, a non-linearity model (e.g., modeling the nonlinearity of the non-linear circuit via which the symbols were processed in block 1002) is applied to the partial response signal generated in block 918, resulting in the second partial response feedback signal.

Figure 9B:
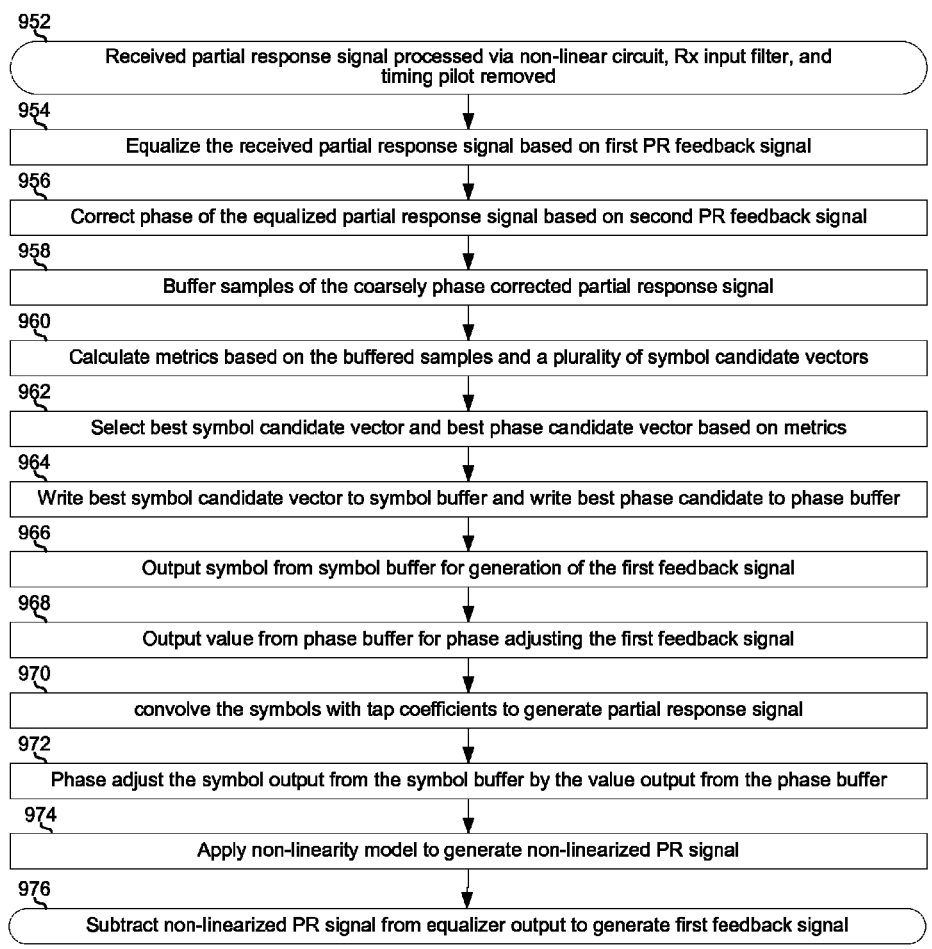
FIG. 9B is a flowchart illustrating an example process for equalization of a partial response signal using a partial response feedback signal.

FIG. 9B is a flowchart illustrating an example process for equalization of a partial response signal using a partial response feedback signal. The process begins with block 952 in which a received partial response signal is processed via a non-linear circuit (e.g., front-end 108), via an input filter (e.g., filter 109) and a timing pilot removal circuit (e.g., circuit 110). In block 954, the signal resulting from the processing of block 952 is equalized (e.g., via equalizer 202), where the equalization is based on a first partial response feedback signal (e.g., signal 201). In block 956, the phase error of the equalized partial response signal is corrected (e.g., via phase adjust circuit 206) based on a second partial response feedback signal (e.g., signal 207). In block 958, samples of the phase corrected partial response (e.g., sampled at the symbol frequency) are buffered (e.g., in buffer 212). In block 960, the buffered samples are input to a sequence estimation process (e.g., performed by sequence estimation circuit 112) in which metrics are calculated based on the buffered samples of the phase corrected partial response signal (e.g., PR1) and based on a plurality of symbol candidates (e.g., $SC_n^1 \ldots SC_n^{M \times Su \times P}$) and one or more phase candidates (e.g., $PC_n^1 \ldots PC_n^{M \times Su \times P}$). In block 962, a best symbol candidate and best phase candidate are selected based on the calculated metrics. In block 964, the best symbol candidate is written to a symbol buffer (e.g., buffer 310) and the best phase candidate is written to a phase buffer (e.g., buffer 312).

In block 966, a vector of one or more symbols of the symbol buffer (e.g., L symbols beginning at index q2) is output for generation of the first feedback signal. In block 968, a value of the phase buffer (e.g., at index q3=q2) is output for generation of the first feedback signal. In block 970, the vector output in block 966 is convolved (e.g., by circuit 316a) with tap coefficients (e.g., tap coefficients corresponding to response h) to generate a partial response signal (e.g., signal 315a). In block 972, a phase correction is applied (e.g., by circuit 314) to the partial response signal generated in block 970 based on the value output from the phase buffer in block 968. The result of block 970 is a phase-adjusted partial response signal (e.g., signal 205). In block 974, a non-linearity model (e.g., modeling the nonlinearity of the non-linear circuit via which the symbols were processed in block 1002) is applied to the partial response signal generated in block 918, resulting in a non-linearized partial response signal. In block 976, the non-linearized partial response signal generated in block 974 is subtracted from the equalizer output to generate the first partial response feedback signal.

Figure 10:
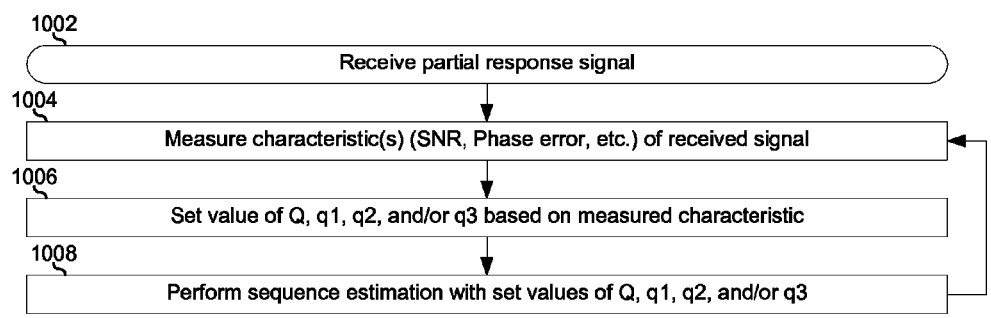
FIG. 10 is a flowchart illustrating adaptation of feedback loop bandwidth.

FIG. 10 is a flowchart illustrating adaptation of feedback loop bandwidth. The process begins with block 1002 when a partial response signal received by a receiver (e.g., a receiver comprising components 108, 109, 110, 112, and 114). Next, in block 1004, characteristics (e.g., signal-to-noise ratio, symbol error rate, bit error rate, etc.) of the received signal are measured (e.g., in the front-end 108 and/or by a digital signal processing circuit downstream from the de-mapper 114). For example, the metrics calculated by the sequence estimation circuit 112 may be used in generating an estimate of SNR and/or phase error. In block 1006, a value one or more parameters (e.g., Q, q1, q2, and/or q3) may be configured based on the characteristics measured in block 1004. In this manner, parameters may be configured during run-time (e.g., in, or near, real-time) based, for example, on recently received signals and/or signals currently being received. Parameters may be configured as needed based on the bandwidth of the feedback loops that control an equalizer (e.g., 202) and/or a carrier recovery circuit. (e.g., 208). In block 1008, sequence estimation may be performed on the received signal using the parameter values set in block 1006.

In an example implementation, a receiver may receive an inter-symbol correlated (ISC) signal (e.g., signal 122). The receiver may equalize, via an equalizer (e.g. 202), the received ISC signal to generate an equalized signal (e.g., 222). The equalization may be based on a first inter-symbol correlated (ISC) feedback signal (e.g., 203). The receiver may correct, via a phase adjuster (e.g., 206) based on a second ISC feedback signal (e.g., 207), a phase error of the equalized signal to generate a phase-corrected equalized signal (e.g., 226). One or both of the first ISC feedback signal and the second ISC feedback signals may be partial response signals generated via a convolution with tap coefficients. Generation of the first ISC feedback signal may comprise convolution of an estimated symbol vector (e.g., L symbols, beginning at index q2, from the symbol buffer 310) with a plurality of tap coefficients, the convolving resulting in a first estimated ISC signal (e.g., 315a). Generation of the first ISC feedback signal may comprise phase adjustment of the first estimated ISC signal to generate a second estimated ISC signal. Generation of the first ISC feedback signal may comprise application (e.g., in circuit 316a) of a model of a non-linear circuit (e.g., 106 and/or 108) through which the received signal passed to the second estimated ISC signal. The tap coefficients may be based on tap coefficients of a partial response filter (e.g., 104 and/or 109). Generation of the second ISC feedback signal may comprise convolution of an estimated symbol vector (e.g., L symbols, beginning at index q1, from the symbol buffer 310) with a plurality of tap coefficients, the convolution resulting in a third estimated ISC signal (e.g., 317). Generation of the second ISC feedback signal may comprise application (e.g., in circuit 316a) of a model of a non-linear circuit (e.g., 106 and/or 108) through which the received signal passed to the third estimated ISC signal. Circuitry of the receiver may control, during run-time of the equalizer, a bandwidth of one or both of a first feedback loop comprising the first ISC feedback signal, and a second feedback loop comprising the second ISC feedback signal, the controlling being based on a measured performance indicator (e.g., an indicator of channel conditions and/or receiver performance such as noise levels, signal to noise ration (SNR), symbol error rate (SER), value of the signal 228, etc.). The control may comprises adjustment one or more buffer index values (e.g., q1, q2, and/or q3) wherein a first one of the buffer index values (e.g., q2) corresponds to a buffer element that is read for generating the first ISC feedback signal, and a second one of the buffer index values (e.g., q1) corresponds to a buffer element that is read for generating the second ISC feedback signal.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   in an electronic receiver:
   receiving a partial-response-domain signal;
   converting said received partial-response-domain signal to a symbol-domain signal, said converting comprising equalizing said received partial-response-domain signal to generate an equalized partial-response-domain signal;
   converting said symbol-domain signal to a first partial-response-domain feedback signal;
   configuring said electronic receiver based on said first partial-response-domain feedback signal;
   generating an error signal based on said first partial-response-domain feedback signal and said equalized partial-response-domain signal, said generating comprising, calculating a Euclidean distance between said first partial-response-domain feedback signal and said equalized partial-response-domain signal.

2. The method of claim 1, comprising, as part of said converting said symbol-domain signal to said first partial-response-domain feedback signal, convolving said symbol-domain signal with a plurality of tap coefficients.

3. A method comprising:
   in an electronic receiver:
   receiving a partial-response-domain signal;
   converting said received partial-response-domain signal to a symbol-domain signal, said converting comprising equalizing said received partial-response-domain signal to generate an equalized partial-response-domain signal;
   converting said symbol-domain signal to a first partial-response-domain feedback signal;
   configuring said electronic receiver based on said first partial-response-domain feedback signal;
   converting said symbol-domain signal to a second partial-response-domain feedback signal; and
   phase adjusting said equalized partial-response-domain signal based on said second partial-response-domain feedback signal.

4. The method of claim 3, comprising generating an error signal based on said first partial-response-domain feedback signal and said equalized partial-response-domain signal.

5. The method of claim 3, comprising, as part of said converting said symbol-domain signal to said first partial-response-domain feedback signal, convolving said symbol-domain signal with a plurality of tap coefficients.

6. A method comprising:
in an electronic receiver:
receiving a partial-response-domain signal;
converting said received partial-response-domain signal to a symbol-domain signal, wherein said converting comprises convolving said symbol-domain signal with a plurality of tap coefficients;
converting said symbol-domain signal to a first partial-response-domain feedback signal;
configuring said electronic receiver based on said first partial-response-domain feedback signal; and
determining said plurality of tap coefficients based on tap coefficients of a filter of a transmitter from which said received partial-response-domain signal was received.

7. The method of claim 6, comprising, as part of said converting said received partial-response-domain signal to said symbol-domain signal, equalizing said received partial-response-domain signal to generate an equalized partial-response-domain signal.

8. The method of claim 6, comprising, as part of said converting said received partial-response-domain signal to said symbol-domain signal, equalizing said received partial-response-domain signal to generate an equalized partial-response-domain signal.

9. The method of claim 8, comprising generating an error signal based on said first partial-response-domain feedback signal and said equalized partial-response-domain signal.

10. A method comprising:
in an electronic receiver:
receiving a partial-response-domain signal;
converting said received partial-response-domain signal to a symbol-domain signal;
converting said symbol-domain signal to a first partial-response-domain feedback signal, said converting said symbol-domain signal to said first partial-response-domain feedback signal comprising processing said symbol-domain signal via a nonlinearity modeling circuit; and
configuring said electronic receiver based on said first partial-response-domain feedback signal.

11. The method of claim 10, wherein said nonlinearity modeling circuit models a nonlinearity of a transmitter from which said received partial-response-domain signal was received.

12. The method of claim 10, wherein said nonlinearity modeling circuit models a nonlinearity of a front-end of said electronic receiver.

13. The method of claim 10, comprising, as part of said converting said received partial-response-domain signal to said symbol-domain signal, equalizing said received partial-response-domain signal to generate an equalized partial-response-domain signal.

14. The method of claim 13, comprising generating an error signal based on said first partial-response-domain feedback signal and said equalized partial-response-domain signal.

15. The method of claim 10 comprising, as part of said converting said symbol-domain signal to said first partial-response-domain feedback signal, convolving said symbol-domain signal with a plurality of tap coefficients.

16. A system comprising:
circuitry for use in an electronic receiver, wherein the circuitry comprises an equalizer and is operable to:
receive a partial-response-domain signal;
convert said received partial-response-domain signal to a symbol-domain signal, wherein said conversion comprises equalization, via said equalizer, of said received partial-response-domain signal to generate an equalized partial-response-domain signal;
convert said symbol-domain signal to a first partial-response-domain feedback signal;
configure said electronic receiver based on said first partial-response-domain feedback signal; and
generate an error signal based on said first partial-response-domain feedback signal and said equalized partial-response-domain signal, wherein said generation of said error signal comprises calculation of a Euclidean distance between said first partial-response-domain feedback signal and said equalized partial-response-domain signal.

17. The system of claim 16, wherein said conversion of said symbol-domain signal to said first partial-response-domain feedback signal comprises convolution of said symbol-domain signal with a plurality of tap coefficients.

18. A system comprising:
circuitry for use in an electronic receiver, wherein the circuitry comprises an equalizer and is operable to:
receive a partial-response-domain signal;
convert said received partial-response-domain signal to a symbol-domain signal, wherein said conversion comprises equalization, via said equalizer, of said received partial-response-domain signal to generate an equalized partial-response-domain signal;
convert said symbol-domain signal to a first partial-response-domain feedback signal;
configure said electronic receiver based on said first partial-response-domain feedback signal;
convert said symbol-domain signal to a second partial-response-domain feedback signal; and
phase adjust said equalized partial-response-domain signal based on said second partial-response-domain feedback signal.

19. The system of claim 18, wherein said circuitry is operable to generate an error signal based on said first partial-response-domain feedback signal and said equalized partial-response-domain signal.

20. The system of claim 18, wherein said conversion of said symbol-domain signal to said first partial-response-domain feedback signal comprises convolution of said symbol-domain signal with a plurality of tap coefficients.

21. A system comprising:
circuitry for use in an electronic receiver, wherein the circuitry is operable to:
receive a partial-response-domain signal;
convert said received partial-response-domain signal to a symbol-domain signal;
convert said symbol-domain signal to a first partial-response-domain feedback signal, wherein said conversion of said symbol-domain signal to said first partial-response-domain feedback signal comprises convolution of said symbol-domain signal with a plurality of tap coefficients; and
configure said electronic receiver based on said first partial-response-domain feedback signal, wherein said circuitry is operable to determine said plurality of tap coefficients based on tap coefficients of a filter of a transmitter from which said received partial-response-domain signal was received.

22. The system of claim 21, wherein:
said circuitry comprises an equalizer; and
said conversion of said received partial-response-domain signal to said symbol-domain signal comprises equalization, via said equalizer, of said received partial-response-domain signal to generate an equalized partial-response-domain signal.

23. The system of claim 21, wherein:
said circuitry comprises an equalizer; and
said conversion of said received partial-response-domain signal to said symbol-domain signal comprises equalization, via said equalizer, of said received partial-response-domain signal to generate an equalized partial-response-domain signal.

24. The system of claim 23, wherein said circuitry is operable to generate an error signal based on said first partial-response-domain feedback signal and said equalized partial-response-domain signal.

25. A system comprising:
circuitry for use in an electronic receiver, wherein the circuitry comprises a nonlinearity modeling circuit and is operable to:
receive a partial-response-domain signal;
convert said received partial-response-domain signal to a symbol-domain signal;
convert said symbol-domain signal to a first partial-response-domain feedback signal, wherein said conversion of said symbol-domain signal to said first partial-response-domain feedback signal comprises processing of said symbol-domain signal via said nonlinearity modeling circuit; and
configure said electronic receiver based on said first partial-response-domain feedback signal.

26. The system of claim 25, wherein said nonlinearity modeling circuit models a nonlinearity of a transmitter from which said received partial-response-domain signal was received.

27. The system of claim 25, wherein said nonlinearity modeling circuit models a nonlinearity of a front-end of said electronic receiver.

28. The system of claim 25, wherein:
said circuitry comprises an equalizer; and
said conversion of said received partial-response-domain signal to said symbol-domain signal comprises equalization, via said equalizer, of said received partial-response-domain signal to generate an equalized partial-response-domain signal.

29. The system of claim 28, wherein said circuitry is operable to generate an error signal based on said first partial-response-domain feedback signal and said equalized partial-response-domain signal.

30. The system of claim 25, wherein said conversion of said symbol-domain signal to said first partial-response-domain feedback signal comprises convolution of said symbol-domain signal with a plurality of tap coefficients.

* * * * *